(12) United States Patent
Schaefer

(10) Patent No.: US 8,599,147 B2
(45) Date of Patent: *Dec. 3, 2013

(54) COMPUTER INTERFACE FOR NAVIGATING GRAPHICAL USER INTERFACE BY TOUCH

(75) Inventor: Philip Schaefer, Weaverville, NC (US)

(73) Assignee: Vortant Technologies, LLC, Weaverville, NC (US)

( * ) Notice: Subject to any disclaimer, the term of this patent is extended or adjusted under 35 U.S.C. 154(b) by 968 days.

This patent is subject to a terminal disclaimer.

(21) Appl. No.: 12/126,212

(22) Filed: May 23, 2008

(65) Prior Publication Data

US 2009/0000829 A1    Jan. 1, 2009

Related U.S. Application Data

(63) Continuation of application No. 10/280,581, filed on Oct. 25, 2002, now Pat. No. 7,379,053.

(60) Provisional application No. 60/349,196, filed on Oct. 27, 2001.

(51) Int. Cl.
*G09G 5/00* (2006.01)

(52) U.S. Cl.
USPC ........................................ 345/173; 178/18.03

(58) Field of Classification Search
USPC ................. 345/156, 157, 168, 169, 173–179; 178/18.01, 18.03; 341/22, 23
See application file for complete search history.

(56) References Cited

U.S. PATENT DOCUMENTS

| | | |
|---|---|---|
| 4,914,624 A | 4/1990 | Dunthorn |
| 5,222,895 A | 6/1993 | Fricke |
| 5,223,828 A | 6/1993 | McKiel, Jr. |
| 5,319,747 A | 6/1994 | Gerrissen et al. |
| 5,374,924 A | 12/1994 | McKiel, Jr. |
| 5,463,725 A | 10/1995 | Henckel et al. |
| 5,714,978 A | 2/1998 | Yamanaka et al. |
| 5,736,978 A * | 4/1998 | Hasser et al. ............... 345/173 |
| 5,748,184 A | 5/1998 | Shieh |
| 5,748,185 A | 5/1998 | Stephan et al. |
| 5,764,222 A | 6/1998 | Shieh |
| 5,870,092 A * | 2/1999 | Bedford-Roberts .......... 345/173 |
| 5,872,559 A | 2/1999 | Shieh |
| 5,912,660 A | 6/1999 | Gouzman et al. |
| 6,016,142 A | 1/2000 | Chang et al. |
| 6,061,050 A | 5/2000 | Allport et al. |
| 6,078,308 A | 6/2000 | Rosenberg et al. |
| 6,310,605 B1 | 10/2001 | Rosenberg et al. |
| 6,332,024 B1 | 12/2001 | Inoue et al. |
| 6,448,977 B1 | 9/2002 | Braun et al. |
| 6,463,304 B2 * | 10/2002 | Smethers |
| 6,693,626 B1 | 2/2004 | Rosenberg |
| 6,906,697 B2 | 6/2005 | Rosenberg |

(Continued)

OTHER PUBLICATIONS

US 5,903,456, 05/1999, Schena et al. (withdrawn)

*Primary Examiner* — Regina Liang
(74) *Attorney, Agent, or Firm* — Womble Carlyle Sandridge & Rice, LLP

(57) ABSTRACT

A system for enabling a user to navigate a graphical user interface by touching pads on a touch surface. The arrangement of the pads on the touch surface is static, but the functions associated with each pad dynamically change in correspondence with functions in the graphical user interface. The functions are automatically and dynamically extracted from the software that creates the window display. Certain pads are regularly used for certain user options found in windows.

17 Claims, 4 Drawing Sheets

(56) References Cited

U.S. PATENT DOCUMENTS

| | | |
|---|---|---|
| 6,910,132 B1 | 6/2005 | Bhattacharya |
| 7,084,859 B1 | 8/2006 | Pryor |
| 7,091,948 B2 | 8/2006 | Chang et al. |
| 7,106,305 B2 | 9/2006 | Rosenberg |
| 7,148,875 B2 | 12/2006 | Rosenberg et al. |
| 7,307,622 B2 | 12/2007 | Uchiyama |
| 7,307,623 B2 | 12/2007 | Enomoto |
| 7,379,053 B2 * | 5/2008 | Schaefer ............ 345/173 |
| 2002/0054011 A1 | 5/2002 | Bruneau et al. |
| 2002/0156807 A1 | 10/2002 | Dieberger |
| 2003/0046401 A1 | 3/2003 | Abbott et al. |
| 2003/0063064 A1 | 4/2003 | Braun et al. |
| 2003/0090474 A1 | 5/2003 | Schaefer |
| 2004/0174340 A1 | 9/2004 | Bruneau et al. |
| 2004/0183783 A1 | 9/2004 | Rojas et al. |
| 2006/0119586 A1 | 6/2006 | Grant et al. |
| 2008/0012831 A1 | 1/2008 | Bauman et al. |

* cited by examiner

COMPUTER INTERFACE FOR NAVIGATING GRAPHICAL USER INTERFACE BY TOUCH

CROSS-REFERENCE TO RELATED APPLICATIONS

This application is a continuation of U.S. patent application Ser. No. 10/280,581 filed Oct. 25, 2002, now U.S. Pat. No. 7,379,053 and claims priority to U.S. Provisional Application No. 60/349,196 filed Oct. 27, 2001, each of which application is hereby incorporated by reference herein in its entirety.

GOVERNMENT LICENSE RIGHTS

This invention was made with United States government support under one or more SBIR grants from the National Institutes of Health. The United States government has certain rights in this invention.

FIELD OF INVENTION

This invention relates generally to user input devices and more particularly to a device that enables a user to navigate a graphical user interface by touch.

BACKGROUND

The Microsoft® Windows and Macintosh® operating systems have revolutionized computer usability for the sighted population with their graphical user interfaces. The graphical, window-based interface provides an intuitive, visual replacement for the complex internal representation of the underlying computer data. The vast majority of people find the visually-based organization much easier to use, and many years of development effort have been devoted to creating an easy-to-use environment.

A primary type of the graphical user interface utilizes active portions of a computer screen called windows. (These functional windows are not to be confused with the brand of software distributed by Microsoft that uses windows, which is confusingly called Microsoft Windows. Throughout this specification, functional portions of the computer screen will be referred to as windows (lower case "w") and the brand of software distributed by Microsoft will be referred to as Microsoft Windows (brand name with uppercase "W")). Many other such windows interfaces have been defined for computers, hand-held devices, game controllers, telephones and other electronic devices.

For the majority of the visually impaired users, however, the windows interface has made computer use more difficult. Experience has shown that most visually impaired users take much longer to learn to use windows software applications than they previously did for command line software applications, such as DOS. As described below, the current input/output technologies available to the visually impaired place them at a disadvantage with regard to computer usability. Furthermore, there are a growing number of situations where computers are used but associated computer monitors are not, such as the case in which space limitations preclude a computer screen on the monitor that is large enough to be useful. Therefore, it would be desirable to have a device that enables the user to navigate a graphical user interface by touch, With or without a computer monitor.

All windows software is of a visual, spatial nature, which puts the visually impaired at a significant disadvantage. Many aspects of the computer screen are experienced in parallel by the sighted person, who graphically controls the application with pointing and clicking motions. The user often returns to previously-selected objects on the screen, which can rapidly be accessed through sight. Each new generation of software is more graphically-oriented than the previous, and text is often used more as a hint to the function of the underlying command than the complete identifier.

To make windows software usable and understandable in circumstances where a computer screen cannot be seen or a monitor is not used, therefore, it is important for the interface to be spatially-oriented, to capture the parallel aspects of the software interface, and to allow the user to rapidly examine the available graphical options, and to be able to access previous locations through spatial, rather than memory techniques. Any approach that allows only a small part of the screen to be experienced at any point in time works against this goal. As discussed below, nearly all current approaches do just that.

Screen readers convert text in the window into speech. Various commands can be issued from the keyboard (or using a speech-understanding software), which cause menus to be read out, items to be selected, etc. Unfortunately, screen readers do not present a spatial or parallel experience of the screen. They tend to provide a confusing, lengthy listing of many irrelevant details, leaving the uninitiated user in a state of total confusion. Screen magnifiers magnify a small part of the screen to a size that is readable by the user. For many individuals, those who must magnify individual words or icons to the size of the screen, the spatial, parallel nature of windows software is also lost. The user must serially magnify many objects on the screen to reach the desired point. Unless an accurate mental model of the whole window or screen is established, it is very easy for these users to become hopelessly lost.

Another approach to windows interfacing is to present audible signals to the user to indicate graphical information. For example, U.S. Pat. Nos. 5,223,828 and 5,374,924 disclose technology to provide graphical information about when the mouse pointer is moved over window boundaries, when it is in the title area, etc. This helps to provide a measure of information to the user that is not available in speech-only approaches. The drawbacks to the audible signals are similar to the screen magnifier approach, in that the information is from only a small part of the screen. For the user to obtain a more global experience of the screen, the mouse must be scanned over the entire area. Going back to a previously-visited spot is difficult because no global, parallel experience of the screen is available.

Several approaches have been developed to provide force feedback or other tactile information to the user, such as those disclosed in U.S. Pat. Nos. 5,714,978; 5,736,978; 5,903,456; and 6,078,308. For example, the force required to move the mouse over boundaries can become greater as the distance to the boundary becomes less. Bumps and other tactile information can be presented to the user through this technology as the pointer is moved over various objects on the screen. Several researchers have developed technologies to present a tactile version of what is on the screen. U.S. Pat. No. 5,912,660 discloses using an array of pins to represent a tactile version of an image or part of an image, such as an array of 32 rounded pins for each of three fingers on the mouse. This approach is relatively complex and expensive, due to the mechanical nature of the output mechanism. Like the audible feedback approaches, these devices have the disadvantages of not providing a parallel, spatial sensation to the user.

A touch screen allows tactile input, but indicates the functional areas only visually and does not provide tactile output.

Touch screens do not enable high-speed, multi-fingered operation from the user. Touch Graphics (www.touchgraphics.com) has developed a series of products in which thin, tactile surfaces, called overlays, for particular games and learning applications are placed over a touch screen. This approach provides a spatial, parallel tactile input surface. Unfortunately, however, typical windows applications rapidly change the information on the screen, such as by providing pop-up dialog boxes, drop-down menus, and other short-term graphical structures. It would be impractical to provide overlays for all the potentially-visible graphical structures in rapid succession. Additionally, a touch screen is a very costly item compared to other potential input technologies.

An interesting new technology applicable to a touchable screen is electro-rheological fluids, as disclosed in U.S. Pat. No. 5,222,895. When subjected to an electric field, the viscosity of the fluid changes quickly. A dynamically-changing tactile screen can therefore be created, by producing localized fields at the points where a raised sensation is desired. However, the technology for doing this at high resolution is currently very cumbersome and expensive.

To summarize, many technologies are available for providing a non-visual interface to windows software applications. However, they all have one or more serious shortcomings, the user cannot experience the entire window in parallel; or the interfaces are not adaptive to the typical dynamically-changing screens of windows software applications; or they are very expensive.

Therefore, it is an object of this invention to provide an interface that enables user to examine the contents of an entire window rapidly, and in parallel, by touch. It is another object of this invention to provide a tactile interface that is adaptive to the typical dynamically-changing screens of windows software applications. It is a further object of this invention to provide a tactile interface usable with all software applications having graphical user interfaces. It is another object to provide a tactile interface having low-cost, rugged technology.

SUMMARY OF THE INVENTION

The present invention is a system for enabling a user to navigate a graphical user interface by touching discrete areas of sensitivity, or pads, on a touch surface. The arrangement of the pads on the touch surface is static, but the functions associated with each pad dynamically change in correspondence with functions in the graphical user interface. The functions are automatically and dynamically extracted from the software that creates the window display. Certain pads are regularly used for certain user options found in windows.

DETAILED DESCRIPTION OF THE INVENTION

In windows software applications, the active portion of the screen known as the window, rather than the screen, is the basic unit around which the interface is designed. Window layouts can be quite complex, and a typical main window may well contain over one hundred user options. Many of these user options are primarily for aesthetic visual purposes. The image presented on the computer screen can take on a virtually infinite number of patterns, so generic representation of what is on the screen is nearly impossible. The window, however, is a much more standardized unit than the screen. Windows-based applications are built upon application programming interfaces (API) which supply basic functional units such as the title bar, menus, toggle on/off buttons, scroll bars, list boxes, text boxes, edit boxes, check boxes, etc. These basic functional units give the user various options to receive output information or give input information and are referred to herein as user options. Each option may be represented visually by an icon. Examples of such APIs are known in the art; they may be platform independent, or platform-dependent such as the Microsoft Windows Application Programming Interface or those APIs corresponding to UNIX, Linux, Palm, Macintosh, or other operating system. When creating application software, the programmer places desired basic functional units from the API onto the application window, and connects application code to these elements.

Figure 1:
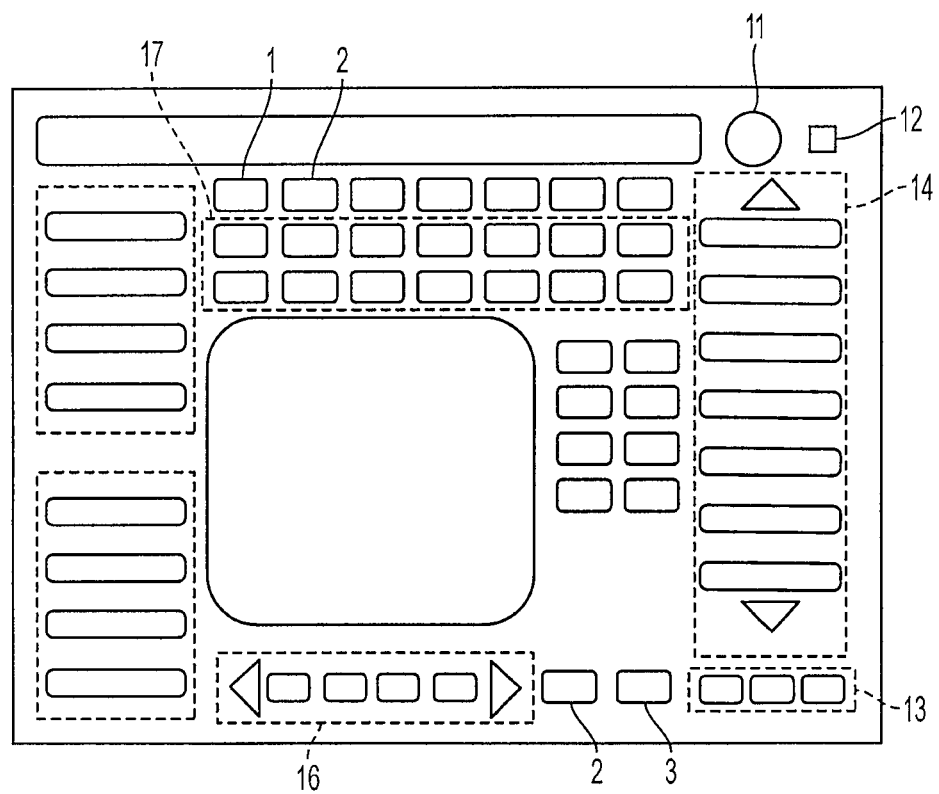
FIG. 1 is a schematic representation of one configuration of a touch surface.
Figure 2:
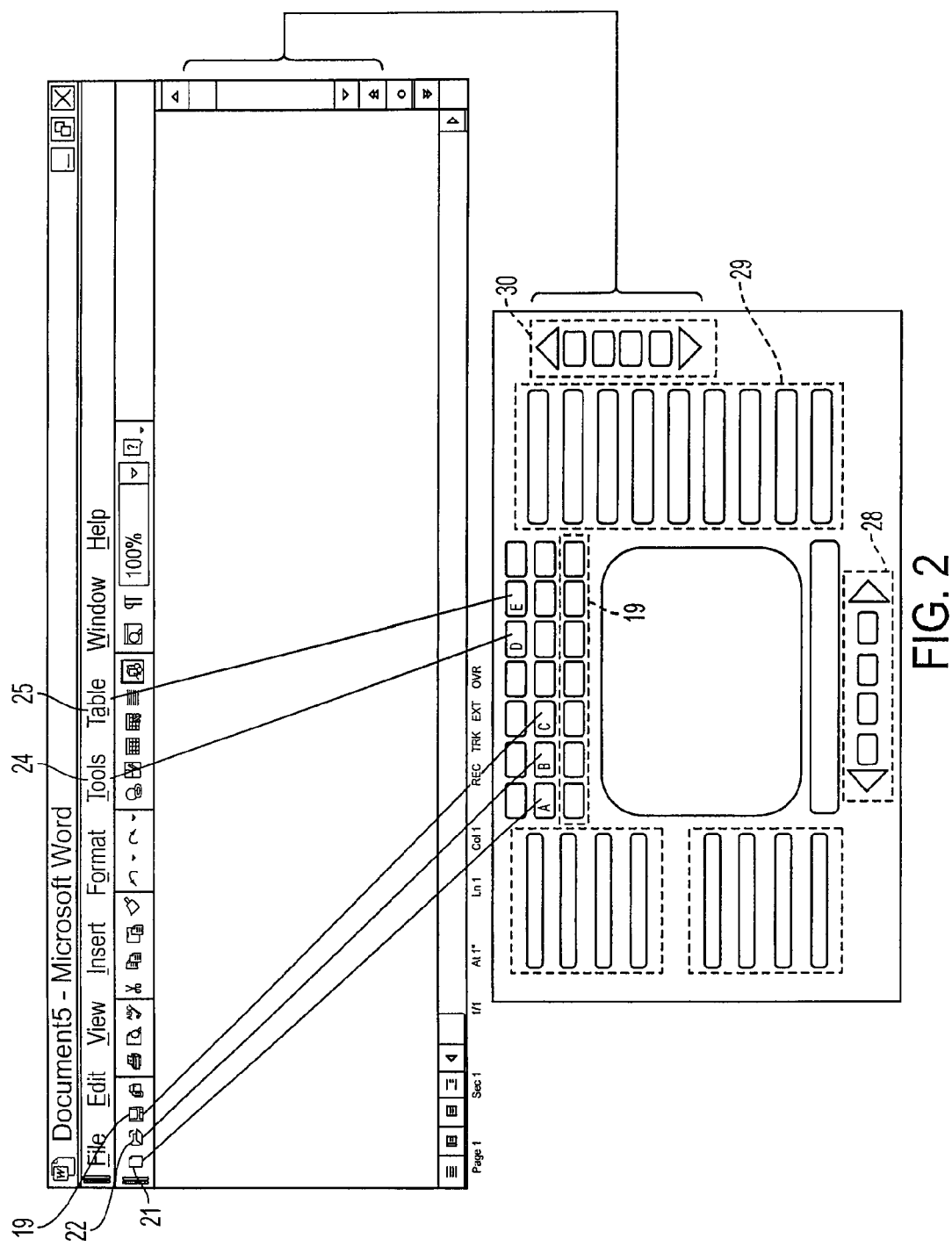
FIG. 2 shows an active window in Microsoft Word and examples of how the window functions would be mapped to pads on a second configuration of a touch surface.
Figure 3:
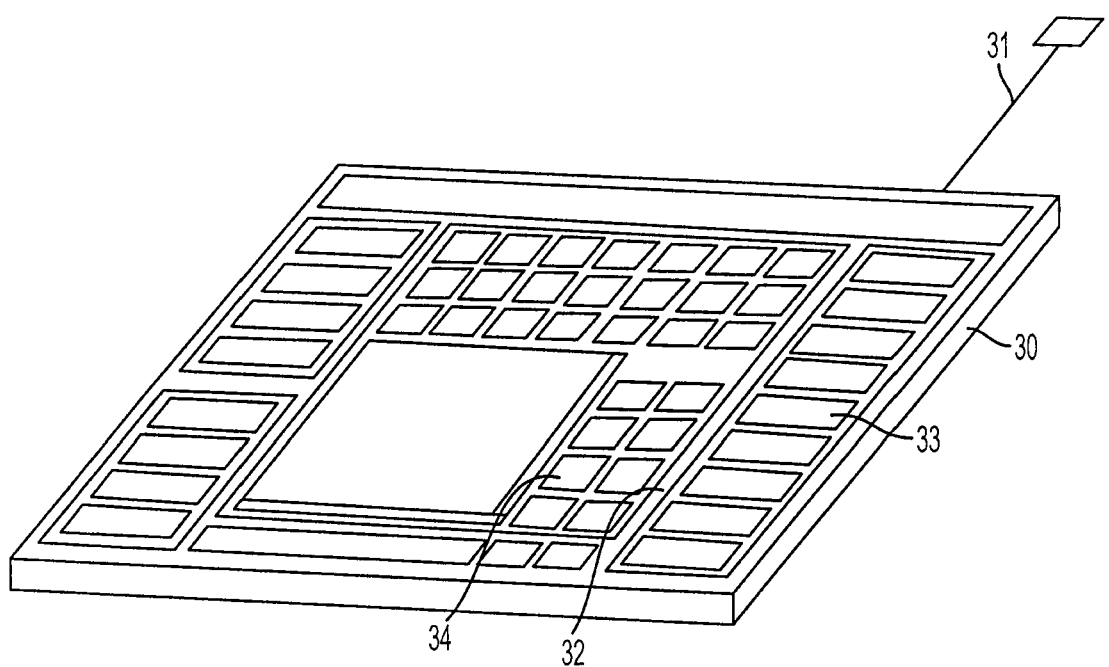
FIG. 3 illustrates a perspective view of the touch surface device of the present invention.

The present invention creates a tactile representation of a visual window. Preferably the tactile representation is similar to the visual appearance of the window, but it may also include user options that are potentially, but not currently, visible on the window. Moreover, not every user option is necessarily represented. The tactile representation is made on a touch surface, which has an array of discrete areas of sensitivity, or pads. The pads, or sets of pads, are associated with the user options. The pads on a touch surface have an unlimited number of arrangements. Likewise, each pad may be associated with an unlimited number of user options. For each embodiment of the touch surface, the arrangement of the pads on the touch surface is static, but the functions associated with each pad dynamically change in correspondence with functions in the graphical user interface. The resultant arrangement of specific set of pads on a touch surface and their specific functions is referred to herein as configuration of the touch surface. The configuration is used to approximate the functions and spatial layout of the user options in the active window. FIGS. 1, 2 and 3 each show a different configuration of the touch surface.

A non-exhaustive list of types of user options and how they could be represented on the touch surface is listed in Table 1:

TABLE 1

| Type of user option | How it could be represented on the touch surface |
| --- | --- |
| Text labels or editable text | Single pad activates text entry pad set |
| Push button | Single pad |
| Menu item on menu bar | One of a row of pads near top of touch surface |
| Drop-down menu item | One of vertical column of pads, which could contain additional pad to right to expand item |
| Title bar | Single pad near top of touch surface |
| Outline item | One of vertical column of pads, which could contain additional pad to right to expand item |
| Text in text window | Group of pads to represent window. Row-like pads to represent rows or paragraphs of text. Use text entry pad set to explore details |
| List item | One of vertical column of pads |
| Radio button | Single pad, possibly round shape |
| Check box | Single small pad |
| Combo box | Single pad to represent selection. Small pad to right for drop-down feature. Use vertical column for list items, as above |

TABLE 1-continued

| Type of user option | How it could be represented on the touch surface |
| --- | --- |
| Window pane | Large pad |
| Tab selections | Tab-shaped pads at top of pane |

In practice, user options can be represented in many ways and some of the pads are shown in FIG. 1. The radio button 11 is touched to toggle the user option on/off, as is check box 12. A drop down menu can be represented in a vertical column of pads 14. Mouse click actions can be approximated in several ways. In one method, the mouse click is approximated by touching pads associated with mouse click function. FIG. 1 shows a left mouse click pad 2 and a right mouse click pad 3. For the case in which the system can measure relative force associated with the user's touch, the mouse click can be approximated by interpreting click gestures on the pads, e.g., pressing harder or briefly lifting, then tapping the touch pad again, or implementing a "dwell" feature. Alternatively, mouse clicks can be approximated by using existing external pointing devices for the disabled.

Relatively simple functions are mapped to single pads. For example, in FIG. 1, the "go back" function may be associated with pad 1, or "insert hyperlink" function may be associated with pad 2. For other examples, FIG. 2 shows an active window in Microsoft Word and examples of how the window functions would be mapped to pads on a second configuration of a touch surface. The "new blank document" user option 21 is mapped to its own pad A. When the user touches pad A, a new blank document is opened. The "open" option is mapped 22 to its own pad B. When the user touches pad B, the directory of files opens. Similarly, the "save" option 23 is mapped 26 to its own pad C. When the user touches pad C, the current document is saved. More complex functions are mapped to a single pad, which then trigger other groups of pads to represent user options grouped within the single pad's user options. For example, a drop down menu such as the "tools" user option 24 is mapped to pad D. When pad D is touched, the pads of column G represent the items within the "tools" drop down menu. Similarly, "table" option 25 is mapped to pad E. When pad E is touched, the pads of column G represent the items within the "table" drop down menu. These additional items called by a user option are referred to as sub-options.

One of the common features of windows software is that multiple windows are often concurrently present on the screen, but only one window is currently selected. The touch surface represents the currently-selected window. To activate another window, a "next window" pad set 13, with a tactile response similar to turning the pages of a book, may be used by the user to switch to the new window and continue operation of the device. As the user touches the pads of the next window pad set in series, the next window is made active. The kinesthetic experience is similar to the experience of turning the pages of a book, in which new material is presented on essentially the same surface as the previous page that had been visible. This also reinforces the concept that a new window is now represented on the touch surface. The user may navigate through all the windows on the screen by use of this "page turn" pad, to get to the desktop, other applications, etc. Alternatively, one or more pads may serve the function of selecting from among available windows, analogous to the way several windows are presented in the task bar of a Microsoft Windows application.

The present invention may provide functionality for text entry. A special text entry pad set 17 can be provided on the touch surface. It consists of one or more rows or columns of sensitive pads each of which can represent a letter, word, or paragraph. The user can move around within the text by touching these pads, in the same way that other pads are used for other user options.

Figure 4:
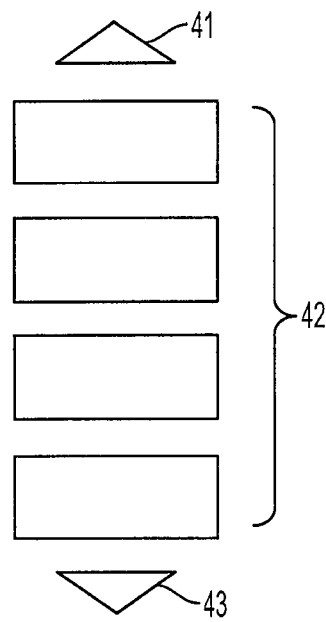
FIG. 4 illustrates a first method of scrolling.

Scrolling is needed whenever there are not enough sensitive elements on the touch surface to represent all of the contents of the window and when an element on the windows display has a scrolling function. There are several approaches to implementing a scrolling function. For example, there may be twenty menu items in an application, but only ten pads available for the menu item representation on the touch surface. FIG. 4 illustrates scrolling pads 41 and 43 placed near the ends of the group of pads 42. Scrolling occurs when the user touches the scroll pads appropriately, causing the mapping of the group of pads 42 to change accordingly. For example, pressing "up" scroll pad 41 causes the user options for the group of pads 42 to indicate options that are above those currently mapped. Conversely, pressing "down" scroll pad 43 causes the user options for the group of pads 42 to indicate options that are below those currently mapped. FIG. 1 shows vertical and horizontal scroll functions available for column 14 or row 16, respectively, of pads.

An alternative method of scrolling is shown in the example of FIG. 2, where a set of scroll pads 30 are placed next to the working area 29 that needs to be scrolled. A set of horizontal scroll pads 28 is configured for horizontal scrolling of rows of pads such as row 19.

Figure 5:
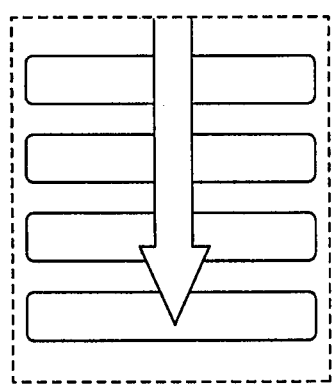
FIG. 5 illustrates a second method of scrolling.

FIG. 5 illustrates another alternative approach that use touches on the same pads as are used to represent the user options. The stroking action of running a finger over the pads at a relatively high velocity causes scrolling. Stroking a series of pads in the downward direction would scroll downward; stroking in the upward direction causes upward scrolling. The velocity of the stroking, measured, for example, by the time intervals between touching of the various pads involved in the stroking action, or, alternately, the number of pads involved in the stroking motion, controls the amount of scrolling that is performed.

A touch surface software application communicates information between the touch surface and the windows application software. The touch surface software application is referred to hereinafter as the touch software. While referred to as separate software applications herein for clarity, it is contemplated that the touch software and the windows software may be combined into one software application or that functions from one software application may be included in the other.

The task of the touch software is to analyze such windows; extract desired user options; implement them on the touch surface by associating them with pads in a process referred to in the art as mapping; and communicate the user input to the windows application.

In analyzing the windows and extracting the desired user options, the desired user options may be determined to be the options most frequently used by the user. However, other criteria may also be used to determine which user options are represented on the touch surface. For example, the touch surface can be configured with the user options that are most common to windows software, even though they may be used relatively rarely in a given windows application. Ideally the extracted user options are chosen using criteria that makes the touch surface having a given arrangement of pads with associated functions useful for all applications. In this way, a standardized touch surface configuration may be developed.

The touch software performs several steps to map the user options to the pads. In the preferred embodiment, the touch software is in electrical communication with the windows application software, enabling the touch software to passively extract information from the windows software. The windows software does not necessarily need to have facilities for actively sending information to the touch software. The touch software identifies the active window within the code or data of the windows software. The touch software also identifies user options by locating code or data in the windows software that is commonly associated with user options in an active window. Similarly, the touch software identifies labels associated with the user options. The touch software extracts the coordinates of the edges of the windows and user input locations on the screen.

There are at least three powerful software techniques known in the art to find these data. One approach is to use "hooks" supplied in the Microsoft Windows operating system. These hooks can be used to watch for window and user option creation events, and use the information from relevant objects in mapping. Another approach is to use "calls" to search through existing items after the application window is created. Another approach in Microsoft Windows operating system is the "Active Accessibility Toolkit". This is a set of routines that developers can use for assistive technology devices to get the information about what windows and window items are on the interface. The Active Accessibility Toolkit can extract most of the information needed for the mapping from many popular windows software.

In the preferred embodiment, the extracted data are mapped to the touch surface using geometric reasoning. For example, the x and y coordinates of each user option are extracted from the windows software and the user option is treated as a rectangle having a left, right, top and bottom sides. Similarly, each pad and group of pads on the touch surface have coordinates relating to a left, right top and bottom side. The location of the user option on the window is matched to a pad having a physical location on the touch surface. The match is optimized so that the relative locations of the user options in the window are as close as possible to the relative location of the pads on the touch surface. For example, if user option A is above user option B and left of user option C, then ideally the pad a on the touch surface corresponding to A is above pad b that corresponds to user option B and to the left of pad c that corresponds to user option C. Because a finite number of pads are used and a finite number of user options are extracted, today's computer processing speeds implement such mapping in only a faction of a second, seeming near real-time to the user. Consequently, mapping can occur each time a new window is made active or each time the user options change within the active window.

Artificial intelligence (AI) search techniques such as a directed search or an AND-OR tree search may be used to reduce the number of computations necessary to map over exhaustive serial testing of every permutation. The AI techniques may use rules to specify essential relationships and lower-priority desirable relationships of the objects, and then find combinations of pads that violate the fewest number of relationships. Storing previously-mapped windows in memory can further reduce the mapping time, as can comparing previously-mapped windows to the active window and updating only those user options that have changed. Such AI techniques will be apparent to those skilled in the art In one example, data is extracted from Outlook Express, a windows application. The following output from the touch software analysis shows some of the important features on an Outlook Express window.

| 3140 Outlook Express | | | | | | | |
|---|---|---|---|---|---|---|---|
| 0 | 0 | (−220,−184,588,396)'Outlook Express' | | | | | |
| 1 | 0 | (4,556,804,576)'http://www.microsoft.com/isap | | | | | |
| 2 | 0 | (4,42,804,102) | | | | | |
| 3 | 0 | (4,42,804,99) | | | | | |
| 4 | 0 | (6,44,758,97) | 'Compose' | 'Message' | ' ' | ' ' | 'Send |
| and' | 'Receive' | ' ' ' ' | 'Address' | 'Book' | ' ' | ' ' | |
| 5 | 8192 | (764,51,802,89) | | | | | |
| 6 | 0 | (4,102,208,556) | | | | | |
| 7 | 129 | (4,102,204,556) | 'Outlook Express' | 'Inbox' | '(3)' | 'Outbox' | |
| | 'Sent Items' | 'Deleted Items' | 'Drafts' | '(1)' | | | |
| 8 | 0 | (208,102,804,556) | | | | | |
| 9 | 0 | (210,104,802,554) | | | | | |
| 10 | 129 | (210,104,802,54) | | | | | |

The touch software thus extracts data from the windows application. The data includes at least the function, label, and coordinates within the active window of each user option. The touch software associates each user option with a pad, or set of pads, as appropriate. Each time a new window is made active or the user options change within the active window, the process is repeated, thus providing the user with updated touch surface configuration each time new user options are available. The update is substantially immediate, thereby reconfiguring the touch surface in real-time with changes in the user options.

In addition to the extraction, the touch software may also receive data from the touch surface as to which pad is being touched, determine which user option the pad is associated with, and send the label text to a text-to-speech routine, a large text display, or a refreshable Braille device. When a pad or set of pads is touched, the touch software sends data to the windows application to activate the user options, such as to place the mouse at the location specified by the user data, effecting a mouse click, entering text, etc.

Using methodology herein, the touch software will be able to represent any windows application. The process is optionally simplified if the windows application provides a customized template. A template is a file created especially for each windows application which tells the touch software what user options are on each window used by the specific application. If template files are available, the touch software would read a template file and associate any user options referenced in the template file to the pads specified in the template file.

Windows software can display more than one window at a time. When a window becomes selected, or made active, on the computer screen, the touch software approximates its spatial pattern by associating a pad, or sets of pads, to the important user options of the active window. User options that are not essential to approximate the current window may be omitted from representation on the touch surface. For example, the complex Microsoft Word window could be approximated on the touch surface as shown in FIG. 2.

The present invention can provide an interface to a graphical user interface regardless of whether a computer monitor is used. Because the touch software extracts the necessary information from the graphical user interface code that creates the display, as opposed to extracting from the display itself, the invention can function independent of a monitor. As a result, the touch software analysis may occur not only upon information displayed to a user, but to information potentially visible to a user within a window. The components of the touch surface device include a tactile surface capable of sensing touch, means for interpreting or measuring the sense data, and means for communicating with the windows application.

Preferably the touch surface utilizes one or more tactile sensations to hierarchically group the pads in sets of functions. For example, partitions may be formed around sets of pads having given functions and FIG. 3 illustrates raised frames that separate the sets of pads. Partition 32 separates pad sets 33 from pad set 34. Depressed partitions are acceptable, also. In FIG. 1, dotted lines surround surfaces having a different tactile sensation from the pads within the group and from the touch surface outside the dotted lines. For example, text entry pad set 17 is tactilely distinct form the vertical column of pads 14. Further, the surface of the pad may be smooth or textured. The pad may be embossed or depressed relative to the plane of the touch surface. The pad may have tactile feedback—that is, have a snap when pressed.

Another embodiment would simply be a surface with no tactile features, but which would rely on the kinesthetic memory of the user to remember on which part of the surface each item occurs. This could be implemented with a simple array of switches or even a touch screen. Other surfaces could be implemented, as long as each allows activation of the particular touch sense technology and gives the user the ability to discriminate between the various user options.

The touch surface comprises discrete areas responsive to touch, which can be implemented in a wide variety of ways as are known in the art. Preferably each pad is a toggle off/on, so that there is no need to determine the location of the touch within the pad. For example, pads may be membrane or elastomeric keypads or electrically sensitive areas on a printed wiring board. Activation of the pad can be determined by electrical changes, such as capacitance, conductance, impedance, or resistance. A preferred embodiment for the touch surface is to use analog electronics such as resistive switches for the pads. Alternatively, mechanical, magnetic (e.g., Hall Effect), temperature, optical proximity, or acoustic sensors could be used to identify which pad is being touched. A small current could also be induced through conductive, inductive, or capacitive pickup locations by coupling a small amount of AC or DC energy into the user's body through a wrist strap or other contrivance. Any technology that detects the presence of the user's fingers at the location of interest would be appropriate, however, it would be advantageous to use a method that enables a user to explore a window without applying force to each pad, thereby enabling a user to examine the contents of an entire window rapidly, and in parallel, by touch.

Means for interpreting or measuring the sensing data can be implemented in a wide variety of ways as are known in the art. Because complex mathematical computations are not needed, the means can be relatively simple such as an SCR and digital multiplexer. Preferably the means are digital. In the preferred embodiment, a microcontroller is used to perform the measuring and interpreting, as well as several other functions. The microcontroller scans the analog inputs or performs a digital timing routine to get readings from the pads' electrical pickups and determines which pads are in contact with the user's fingers from this data. It formats the touch information for transmission to the windows application and creates serial output data packets to send to the windows application to simulate user input. In one embodiment of the touch surface device as shown in FIG. 3, a tactile surface is mounted onto one side of a printed wiring board, which is mounted onto a thin plastic enclosure 30. A cable 31 extends from the compact touch surface to the computer hosting the windows application to make electrical communication. Alternatively, the touch surface device may communicate wirelessly using, for example, radio frequency signals. As shown, the plastic enclosure will weigh just a few ounces, making it easy to use in the lap, held in one hand, or on a desktop orientation.

Typically the computer upon which the windows application is installed will perform the extraction and association functions. In this manner, the touch surface device can be made quite simple and therefore inexpensively. However, if the host computer having the windows application is not capable of the processing required, as is likely the case with a simple game controller, the touch surface device could be made with a more powerful processor and mare (or all) of the functions described herein could be implemented on the touch surface device.

In a second preferred embodiment, as the user touches each pad, non-visual clues are provided to the user. Alternatively, the label may be displayed in very large type on the computer screen (possibly with the graphic). Or, the label may be displayed on a refreshable Braille device. Similarly, mouse click and page turn actions may be conveyed to the user by a sound or other non-visual method. Alternatives to the page turning switch could also be implemented. When the software application creates a new window, a sonic cue to the user may be presented. Simple voice announcements that a new window is being displayed could be used, other audio or visual cues could also be used to identify that a new window is being displayed. The non-visual cues can be provided by the touch surface device if the host computer for the windows application cannot provide such features in real time.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

I claim:

1. A system that interfaces with a user via touch comprising:
a touch device comprising an array of pads configured to be engaged by a user;
at least one processor configured to execute software applications, the software applications comprising:
a user interface software application configured to generate a graphical user interface for presentation on an electronic display, the graphical user interface including a plurality of user-selectable options arranged in an array at separate positions within the graphical user interface; and
a touch software application configured to identify the user-selectable options, to identify the positions at which the individual user-selectable options are arranged in the graphical user interface, and to map individual ones of the user-selectable options to individual ones of the pads in the touch device based on the positions of the user-selectable options in the graphical user interface and the positions of the pads on the touch device such that a user can navigate the graphical user interface by touching the pads.

2. The system according to claim 1, further comprising a an electronic display, wherein the user interface software application displays the graphical user interface on the electronic display and individual user-selectable options are represented as separate windows in the graphical user interface.

3. The system according to claim 2, wherein the user-selectable options are dynamically associated with one or more pads responsive to a window being made active.

4. The system according to claim 1, wherein the touch software application is configured to sound a cue responsive to a different window being made active.

5. The system according to claim 1, wherein the touch software application is configured to map individual ones of the user-selectable options to individual ones of the pads dynamically at the time of display of the graphical user interface.

6. A system that interfaces with a user via touch, the system comprising:
 a touch surface having an array of individually engageable pads;
 at least one processor configured to execute computer software applications including:
  a first software application configured to generate a graphical user interface for display on an electronic display, the graphical user interface comprising a plurality of separate windows, wherein individual ones of the windows comprise separate sets of user-selectable options, the user-selectable options within a given set being arranged in an array at separate positions within the corresponding window, and wherein the first software application is configured such that one of the windows is made active responsive to user selection of the window;
  a second software application in communication with the first software application and with the touch surface, the second software application being configured to identify the user-selectable options for the currently active window, to identify the positions at which the individual user-selectable options are arranged in the currently active window, and to map individual ones of the user-selectable options to individual ones of the pads in the touch device based on the positions of the user-selectable options in the currently active window and the positions of the pads on the touch surface.

7. The system according to claim 6, wherein the second software application is configured such that identification of the user-selectable options, identification of the positions of the user-selectable options, and mapping of the user-selectable options is performed responsive to a different window being made active.

8. The system according to claim 6, wherein the second software application is configured such that identification of the user-selectable options, identification of the positions of the user-selectable options, and mapping of the user-selectable options is performed responsive to the user-selectable options changing within the currently active window.

9. The system according to claim 6, wherein the first software application and/or second software application are configured to sound a cue responsive to a different window being made active.

10. The system according to claim 6, wherein the first software application and the second software application are configured such that responsive to a user stroking a subset of pads serially a different window is made active, thereby simulating the feel of turning a page in a book.

11. The system according to claim 6, wherein the first software application and the second software application are configured such that responsive to a user touching one or more of a subset of pads the contents of the currently active window scroll.

12. The system according to claim 6, wherein the first software application and the second software application are configured such that responsive to a user touching one or more of a subset of pads the user-selectable options scroll.

13. The system of claim 6, wherein the second software application is further configured to obtain descriptive information describing the user-selectable options of the currently active window, and wherein the mapping of individual ones of the user-selectable options to individual ones of the pads on the touch surface is further based on the descriptive information.

14. The system according to claim 6, further comprising:
 an electronic display, and wherein the first software application is further configured to present the windows on the electronic display.

15. The system according to claim 6, further comprising an audio transducer, and wherein the second software application is further configured to cause, responsive to a pad mapped to a user-selectable option being touched by a user, the audio transducer to emit an audible message indicating the user-selectable option.

16. The system according to claim 6, wherein the second software application is further configured to cause, responsive to a pad mapped to a user-selectable option being touched by a user, a label of the user-selectable option in large type to be displayed on the electronic display.

17. The system according to claim 6, further comprising a refreshable Braille device, wherein the second software application is further configured to cause, responsive to a pad mapped to a user-selectable option being touched by a user, a label of the user-selectable option to be presented on the refreshable Braille device.

* * * * *